United States Patent
Le Bris

[11] Patent Number: 6,135,244
[45] Date of Patent: Oct. 24, 2000

[54] PLATE DEVICE FOR SUPPORTING AT LEAST ONE BRAKE PAD FOR A VEHICLE DISC BRAKE

[75] Inventor: Jean-Pierre Le Bris, Argenteuil, France

[73] Assignee: AlliedSignal Materiaux de Friction, Drancy, France

[21] Appl. No.: 08/897,510

[22] Filed: Jul. 21, 1997

[30] Foreign Application Priority Data

Jul. 22, 1996 [FR] France .................................. 96 09174

[51] Int. Cl.⁷ .................................................. F16F 65/38
[52] U.S. Cl. .................................. 188/73.37; 188/250 B
[58] Field of Search .......................... 188/73.37, 250 E, 188/73.36, 250 G, 73.1, 250 B, 18 A

[56] References Cited

U.S. PATENT DOCUMENTS

| | | | |
|---|---|---|---|
| 4,155,430 | 5/1979 | Kawamura | 188/73.1 |
| 4,603,760 | 8/1986 | Myers | 188/73.37 |
| 5,396,972 | 3/1995 | Grele | 188/250 G |
| 5,429,216 | 7/1995 | Kahr | 188/73.1 |
| 5,494,140 | 2/1996 | Weiler et al. | 188/73.38 |
| 5,538,104 | 7/1996 | Katz et al. | 188/73.1 |
| 5,743,361 | 4/1998 | Winter | 188/250 G |

FOREIGN PATENT DOCUMENTS

| | | | |
|---|---|---|---|
| 0 373 333 A2 | 6/1990 | European Pat. Off. | |
| 0 636 807 A1 | 2/1995 | European Pat. Off. | |
| 2008056 | 10/1979 | Germany | 188/250 G |
| 56-160437 | 12/1981 | Japan | 188/73.1 |
| 61-82029 | 4/1986 | Japan | 188/250 G |
| 1110896 | 4/1968 | United Kingdom | 188/250 B |
| 1206426 | 9/1970 | United Kingdom | 188/73.37 |
| 2132293 | 7/1984 | United Kingdom | 188/250 B |
| 2 262 145 | 6/1993 | United Kingdom . | |
| WO 92/18785 | 10/1992 | WIPO . | |

OTHER PUBLICATIONS

Derwent WPI Acc No 90–186840/199025, English language translation to EPO 0 373 333 A.

*Primary Examiner*—Michael Mar
*Assistant Examiner*—Bradley King
*Attorney, Agent, or Firm*—Pennie & Edmonds LLP

[57] ABSTRACT

A plate device for supporting at least one brake pad for a vehicle disc brake, wherein a noise-preventing plate is assembled to a pad-carrying plate by a solid central boss of the supporting plate and inserted into a window of mating shape complementary of that of the noise-preventing plate.

11 Claims, 3 Drawing Sheets

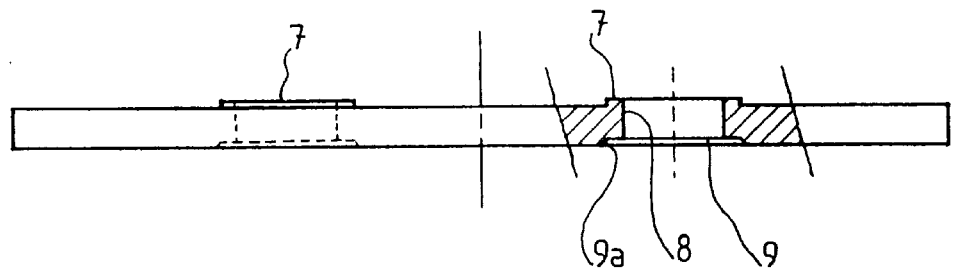
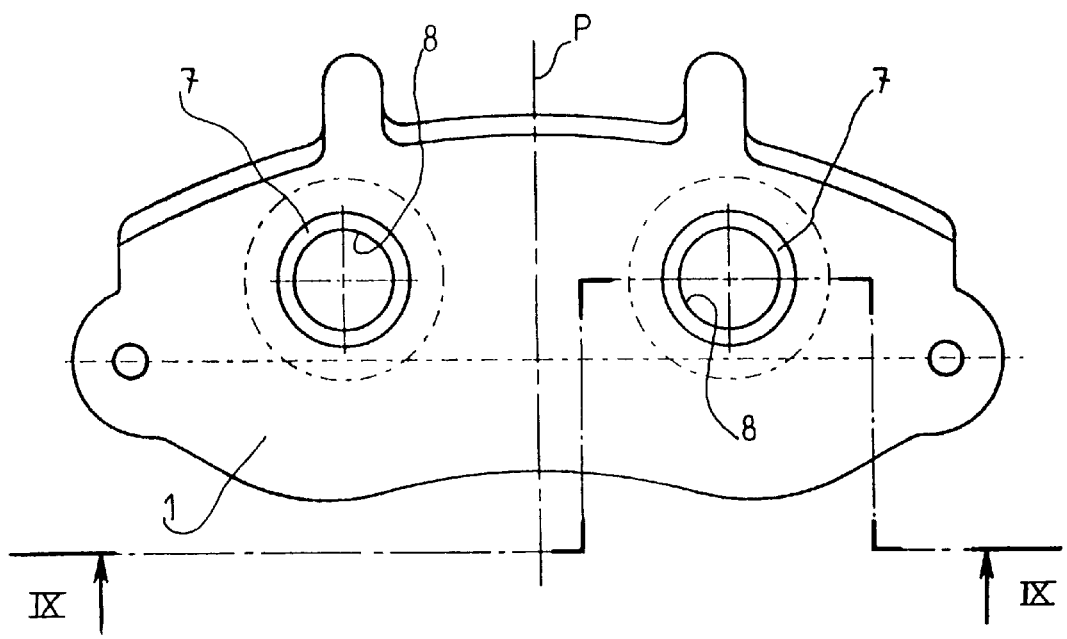
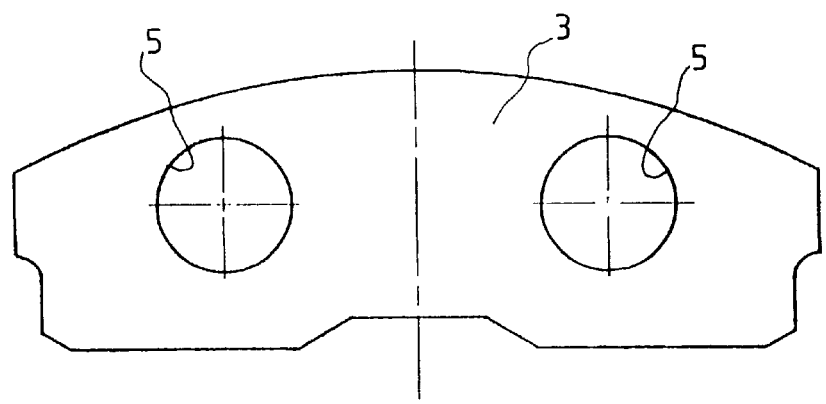

PLATE DEVICE FOR SUPPORTING AT LEAST ONE BRAKE PAD FOR A VEHICLE DISC BRAKE

BACKGROUND OF THE INVENTION

The present invention relates to a device forming a plate for supporting at least one brake pad for a vehicle disc brake.

SUMMARY OF THE INVENTION

One knows such a device which comprises on the back of the pad-carrying plate a noise-preventing or vibration-preventing plate fastened to the supporting plate generally by a rubber-based adhesive bond.

This noise-preventing plate is intended to absorb the vibrations likely to occur during the braking of the vehicle and resulting in unpleasant noises.

However the heat produced by the friction of the brake pad upon the brake disc may be very great with a temperature of the order of 500° C. and may be conveyed through the medium of the pad-carrying plate to the noise-preventing plate. Such a generation of heat has a tendency to soften the adhesive bond for the fastening of the noise-preventing plate to the pad-carrying plate so that the brake torques are likely to cause the slipping or sliding and even the separation of the noise-preventing plate in relation to the pad-carrying plate.

Such a problem is also raised when the noise-preventing plate is secured to the pad-carrying plate by any other means since the braking torques always have the tendency to displace the noise-preventing plate in relation to the pad-carrying plate.

The object of the present invention is to remove the inconvenience referred to hereinabove of the known devices by providing a device permitting to effectively hold the noise-preventing plate in spite of the softening of the bonding adhesive connecting the latter to the plate supporting the brake pad.

For that purpose the device according to the invention forming a plate for supporting at least one brake pad for a vehicle disc brake, comprising on the back of the supporting plate opposite to the pad-carrying plate, a noise-preventing plate fastened to the supporting plate, is characterized in that the noise-preventing plate is in addition assembled to the supporting plate by at least one means made fast to the supporting plate and preventing the displacement of the noise-preventing plate in relation to the supporting plate in a plane substantially parallel to the plane of the supporting plate when the fastening adhesive of the noise-preventing plate softens in view of a warming up resulting from the frictions of the brake pad upon the brake disc.

Preferably the assembly means comprises a boss forming an islet the overall transverse size of which in parallel relation to the plane of the supporting plate is greater than its height projecting with respect to the supporting plate and engaging a window or opening with a mating shape corresponding to that of the noise-preventing plate.

According to one embodiment, the boss is a central, single, solid or massive formation with a rectangular shape and is parallel or normal to a tangential direction of the curved supporting plate.

According to another embodiment, the device comprises two like cylindrical hollow bosses arranged on a same axis parallel to a direction tangential to the curvature of the supporting plate symmetrically with respect to the transverse plane of symmetry of the supporting plate.

Advantageously each boss comprises a peripheral ledge resting upon the external face of the noise-preventing plate for holding the latter onto the supporting plate.

The aforesaid central boss is made by stamping so that the impression formed opposite to the boss serves as a means for additionally retaining the brake pad.

The supporting plate is stackable upon another identical supporting plate for the storage of supporting plates and are positioned with respect to each other by the boss of one of them fittingly inserted into the impression of the other one.

This impression advantageously exhibits a peripheral rake or backing off permitting to facilitate the withdrawal of a supporting plate from underneath the adjacent upper supporting plate.

Both cylindrical hollow bosses are made concentrically to two bores, respectively, of the supporting plate into each one of which is cast brake pad material during the moulding thereof onto the supporting plate.

Two spot facings are made concentrically to both bores, respectively, on that side or face of the supporting plate which is opposite to both hollow cylindrical bosses and have each one a chamfer-like inclined side wall.

Preferably the projecting height of one boss in flush aligned relationship with the noise-preventing plate lies between about 0.4 mm and about 1.5 mm.

The invention will be better understood and further objects, characterizing features, details and advantages thereof will appear more clearly as the following explanatory description proceeds with reference to the attached diagrammatic drawings given by way of non-limiting examples only illustrating three presently preferred specific embodiments of the invention and in which:

BRIEF DESCRIPTION OF THE DRAWINGS

FIG. 8 is a top view of the pad-carrying plate according to a third embodiment of the invention;

FIG. 9 is a view in section taken upon the line IX—IX of FIG. 8; and

FIG. 10 is a top view of the noise-preventing plate alone as used with the pad-carrying plate of FIG. 8.

DETAILED DESCRIPTION OF THE PREFERRED EMBODIMENT

Figure 1:
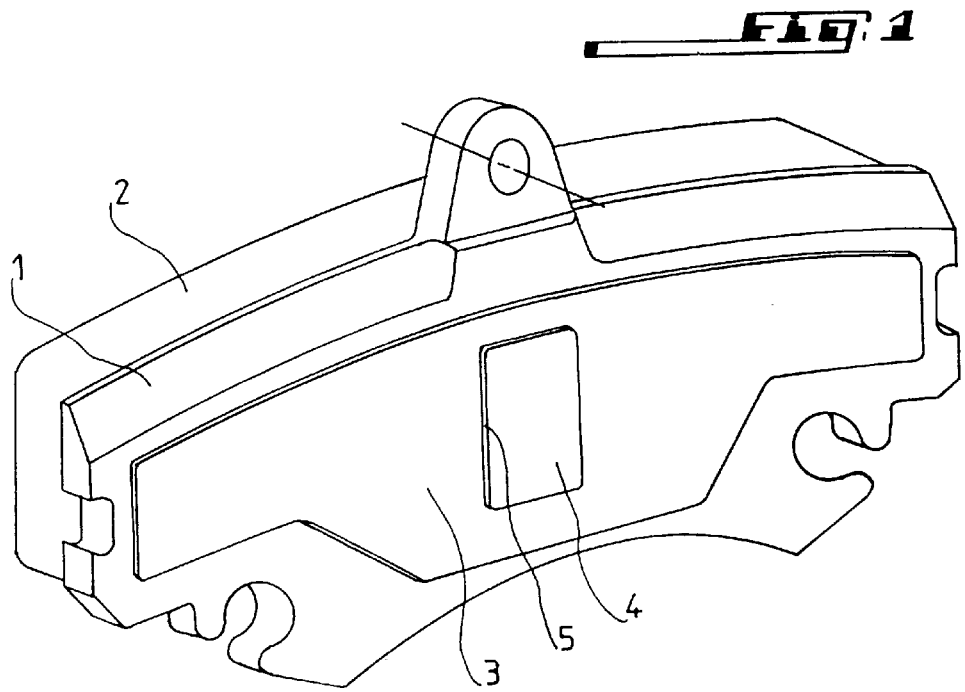
FIG. 1 is a perspective view of a device forming a plate for supporting at least one brake pad for a vehicle disc brake according to the invention.
Figure 3:
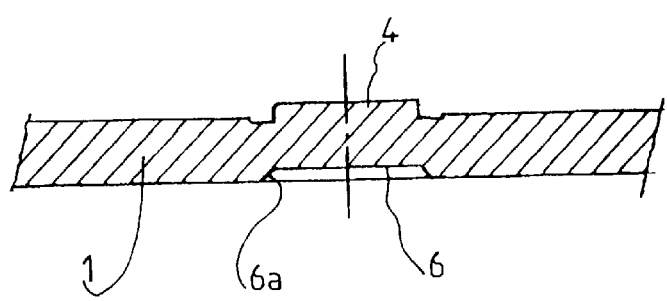
FIG. 3 is an enlarged partial view in section taken upon the line III—III of FIG. 2.
Figure 2:
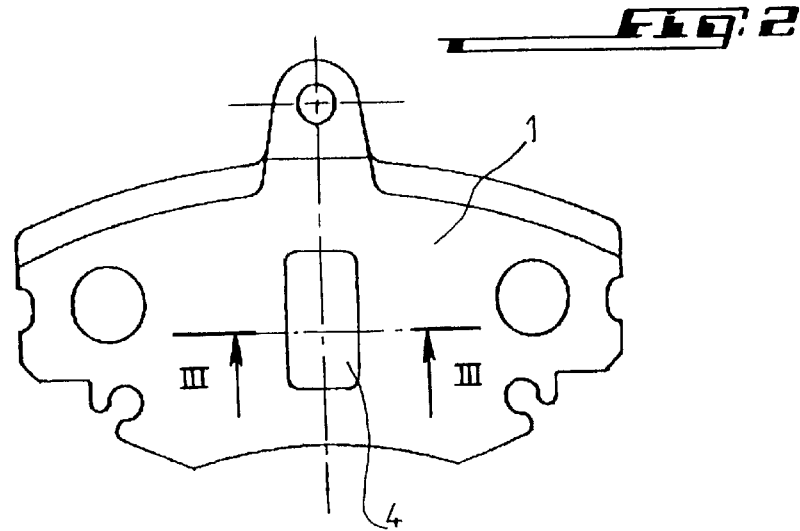
FIG. 2 is a top view of the brake pad-carrying plate.
Figure 4:
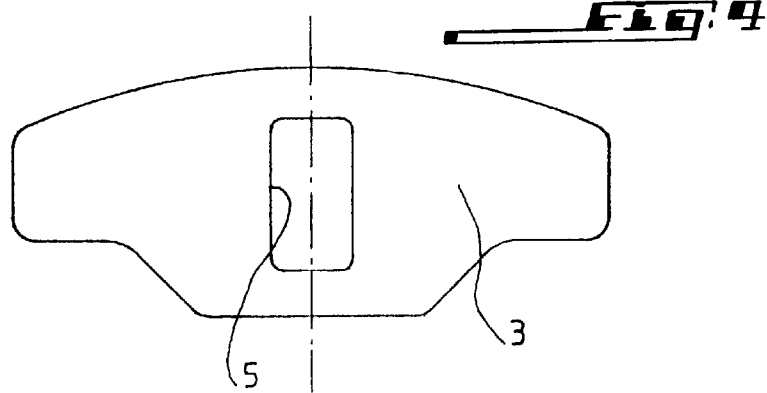
FIG. 4 is a top view of the noise-preventing plate alone used with the pad-carrying plate of FIG. 2.

Referring to FIGS. 1 to 4 relating to the first embodiment of the invention, the reference numeral 1 designates a plate for supporting at least one brake pad 2 forming part of a disc brake device of an automotive vehicle essentially comprising a caliper inside of which brake pads are moving under the action of at least one piston for being pressed upon a limited sector of the brake disc made fast to the wheel.

As shown two brake pads 2 are fastened to the supporting plate 1 and as known per se a noise-preventing or vibration-preventing plate 3 is secured to the back of the supporting plate 1 opposite to the brake pads 2 by a rubber-based adhesive (not shown). The noise-preventing plate however could be fastened by any other means than adhesive but a rubber plate would then be interposed between the noise-preventing plate and the pad-carrying plate.

According to the invention, the noise-preventing plate 3 is in addition assembled to the supporting plate 1 by a boss 4 made fast to the plate 1 and engaging a window with a mating shape 5 corresponding to or complementary of that of the noise-preventing plate 3 while being in flush aligned relationship with the external face of the plate 3. The boss 4 is solid or massive with a rectangular shape and is formed in the central portion of the supporting plate 1 while being normal to a direction tangential to the curvature of the supporting plate 1. Moreover the boss 4 forms an islet the overall transverse external size or dimension of which in parallel relation to the plane of the supporting plate 1 is greater than the height projecting with respect to the plate 1. Preferably the protruding height of the boss 4 lies between about 0.4 mm and about 1.5 mm.

When the whole unit consisting of the supporting plate 1, the brake pads 2 and the noise-preventing plate 3 is mounted within the disc brake caliper during the braking, the friction of the brake pads 2 upon the brake disc generates heat which is conveyed to the noise-preventing plate 3 with a concurrent risk of softening of the rubber-based adhesive connecting the noise-preventing plate 3 to the supporting plate 1. Under these conditions, the torques resulting from the braking and applied onto the noise-preventing plate 3 have a tendency to displace the noise-preventing plate 3 in relation to the supporting plate 1 in a plane substantially parallel to the plane of the plate 1 thus risking to tear the noise-preventing plate 3 off. The boss 4 is designed to prevent any relative displacement of the noise-preventing plate 3 during a possible softening of the adhesive connecting the noise-preventing plate 3 to the supporting plate 1.

Although this is not shown, the boss 4 may advantageously comprise a peripheral ledge for example provided by hammering and caused to rest upon the corresponding peripheral edge of the window 5 of the plate 3 so as to prevent the latter from moving away from the supporting plate 1.

The boss 4 may be provided by stamping thereby with the formation of an impression 6 into that face of the supporting plate 1 which is opposite to the boss 4. The impression 6 allows to receive the molten material of the brake pad during the moulding thereof onto the supporting plate 1 thereby enabling to provide a means for additionally retaining pads 2 onto the supporting plate 1. Moreover, the provision of the impression 6 allows a precise stacking of plates identical with the supporting plate 1 with one boss 4 of one plate being fittingly inserted into the impression 6 of an upper adjacent plate thereby facilitating the storage by stacking of supporting plates 1 before gripping them preferably automatically the one after another one for carrying them to the place or station of manufacture through moulding of the brake pads made fast to the corresponding supporting plate. The extraction of one supporting plate 1 from below another upper adjacent supporting plate may by facilitated by the provision of a peripheral rake or backing off 6a of the impression 6.

Figure 6:
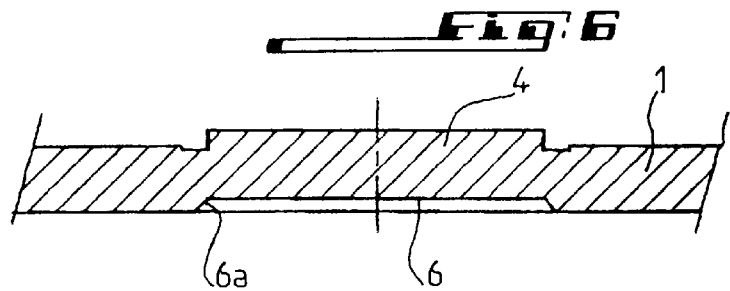
FIG. 6 is an enlarged partial view in section taken upon the line VI—VI of FIG. 5.
Figure 5:
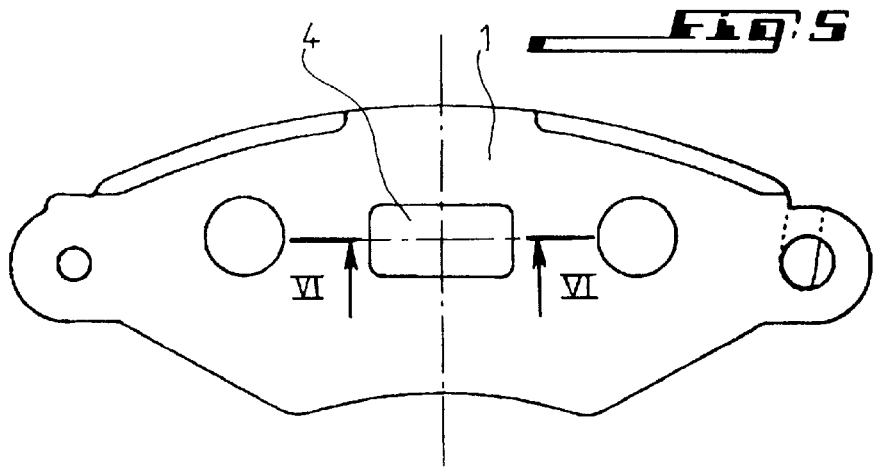
FIG. 5 is a top view of the brake pad-carrying plate according to a second embodiment of the invention.
Figure 7:
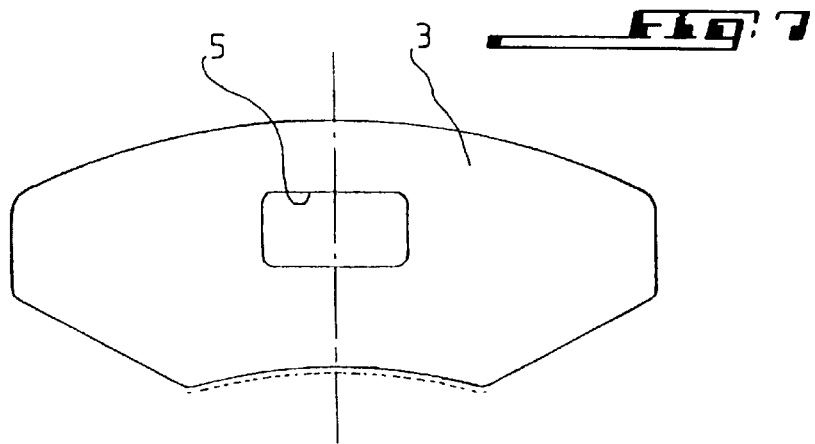
FIG. 7 is a top view of the noise-preventing plate alone as used with the pad-carrying plate of FIG. 5.

The second embodiment of the invention such as shown on FIGS. 5 to 7 differs from the one previously described with reference to FIGS. 1 to 4 only by the orientation of the boss 4 which according to this second embodiment is parallel to a tangential direction of the curved supporting plate 1. Apart from that difference the boss 4 of this second embodiment has the same characterizing features as those of the first embodiment and exhibits the same advantages.

According to the third embodiment of the invention as shown on FIGS. 8 to 10, the supporting plate 1 comprises two identical bosses 7 each one in the shape of a hollow cylinder and arranged on a same axis parallel to a direction tangential to the curvature of the supporting plate while being symmetrical to the plane of symmetry P extending transversely of the supporting plate 1, i.e. perpendicular to the plane of FIG. 8. Each hollow cylindrical boss 7 like the boss 4 of the previous embodiments forms an islet the overall transverse size of which in parallel relation to the plane of the supporting plate 1 is greater than its height projecting with respect to the supporting plate 1 and the projecting height of each boss 7 in flush aligned relationship with the noise-preventing plate 3 is also lying between about 0.4 mm and about 1.5 mm. Each boss 7 may also comprise a circular peripheral ledge or collar (not shown) for example obtained by hammering and caused to rest upon the corresponding a circular edge of the opening 5 of the noise-preventing plate 3 through which this boss is inserted. Preferably, both cylindrical bosses 7 are made concentrically to two bores 8, respectively, of the supporting plate 1 and into each one of which is cast material of the brake pad 2 during the moulding of the latter onto the plate 1 so as to provide a better clinging of the brake pads 2 to the supporting plate 1. The place or position of both bosses 7 takes into account the places or positions of both operating pistons actuating the displacement of the brake pads used with the type of pad-carrying plate 1 of FIG. 8 and which are topping both bossages without being hindered by the latter. FIG. 9 also shows that that face of the supporting plate 1 which is opposite to the corresponding boss 7 comprises a spot facing 9 with a chamfer-like inclined side wall 9a having the same stacking functions and facility of extracting each supporting plate 1 from underneath one upper adjacent supporting plate as those mentioned with reference to the first and second embodiments of the invention.

The device of the invention described hereinabove thus allows to effectively hold the noise-preventing plate while preventing the same from slipping or sliding in relation to the corresponding supporting plate during a softening of its adhesive connecting it to that supporting plate following a warming up to a high temperature during a braking.

What is claimed is:

1. A device forming a plate for supporting at least one brake pad for a vehicle disc brake comprising, on the back of the supporting plate opposite to the pad, a noise-preventing plate fastened to the supporting plate by an adhesive, wherein the noise-preventing plate is assembled to the supporting plate by at least one assembling means made fast to the supporting plate in order to prevent any displacement of the noise-preventing plate in relation to the supporting plate in a plane substantially parallel to the plane of the supporting plate when the adhesive for securing the noise-preventing plate becomes softened due to heating which results from friction of the pad upon the a brake disc, wherein said assembling means comprises a boss having an overall transverse size which, in parallel relation to the supporting plate, is greater than its height projecting with respect to the supporting plate, said boss engaging a complementary mating shaped opening of the noise-preventing plate, wherein the supporting plate is curved and the boss is a central, single, solid formation having a rectangular shape and is positioned parallel or normal to a tangential direction of the curved supporting plate.

2. A device according to claim 1, wherein the central boss is made by stamping so that an impression formed opposite to the boss serves as a means for additionally retaining the brake pad.

3. A device according to claim 2, wherein the supporting plate is stackable upon another identical supporting plate for the storage of supporting plates which are positioned with respect to each other by the boss of one supporting plate fittingly inserted into the impression of another one.

4. A device according to claim 2, wherein the aforesaid impression exhibits a peripheral taper.

5. A device according to claim 1, wherein the projecting height of the boss in flush alignment with the noise-preventing plate lies between about 0.4 mm and about 1.5 mm.

6. A device forming a plate for supporting at least one brake pad for a vehicle disc brake comprising, on the back of the supporting plate opposite to the pad, a noise-preventing plate having an internal face fastened to the back of supporting plate by an adhesive and an external face opposite the internal face, wherein the noise-preventing plate is assembled to the supporting plate by at least one assembling means made fast to the supporting plate in order to prevent any displacement of the noise-preventing plate in relation to the supporting plate in a plane substantially parallel to the plane of the supporting plate when the adhesive for securing the noise-preventing plate becomes softened due to heating which results from friction of the pad upon a brake disc, wherein said assembling means comprises a boss having an overall transverse size which, in parallel relation to the supporting plate, is greater than its height projecting with respect to the supporting plate, said boss extending from the back of the supporting plate through a complementary mating shaped opening of the noise-preventing plate up to a position in flush alignment with the external face.

7. A device according to claim 6, wherein the supporting plate is curved and the boss is a central, single, solid formation with a rectangular shape and is parallel or normal to a tangential direction of the curved supporting plate.

8. A device according to claim 6, wherein the central boss is made by stamping so that an impression formed opposite to the boss serves as a means for additionally retaining the brake pad.

9. A device according to claim 8, wherein the supporting plate is stackable upon another identical supporting plate for the storage of supporting plates which are positioned with respect to each other by the boss of one supporting plate fittingly inserted into the impression of another one.

10. A device according to claim 9, wherein the aforesaid impression exhibits a peripheral taper.

11. A device according to claim 6, wherein the projecting height of the boss in flush alignment with the noise-preventing plate lies between about 0.4 mm and about 1.5 mm.

* * * * *